United States Patent [19]

Lee et al.

[11] 4,347,498

[45] Aug. 31, 1982

[54] METHOD AND MEANS FOR DEMAND ACCESSING AND BROADCAST TRANSMISSION AMONG PORTS IN A DISTRIBUTED STAR NETWORK

[75] Inventors: Robert P. Lee, Woodstock, N.Y.; Felix H. Closs, Adliswil, Switzerland

[73] Assignee: International Business Machines Corporation, Armonk, N.Y.

[21] Appl. No.: 96,356

[22] Filed: Nov. 21, 1979

[51] Int. Cl.³ .............................................. H04Q 3/60
[52] U.S. Cl. ................................. 340/825.02; 370/60; 370/94
[58] Field of Search ......... 340/147 T, 147 R, 147 LP; 370/60, 94, 85

[56] References Cited

U.S. PATENT DOCUMENTS

| | | | |
|---|---|---|---|
| 3,693,155 | 9/1972 | Crafton et al. | 340/147 R |
| 3,889,064 | 6/1975 | Fletcher | 370/85 |
| 3,914,743 | 10/1975 | Fitch et al. | 340/147 R |
| 4,013,959 | 3/1977 | Patterson | 340/147 LP |
| 4,048,441 | 9/1977 | Young | 370/60 |
| 4,063,220 | 12/1977 | Metcalfe et al. | 340/147 LP |

Primary Examiner—Glen R. Swann, III
Attorney, Agent, or Firm—R. Bruce Brodie

[57] ABSTRACT

A demand access broadcast transmission method and means is capable of supporting random port access and any-to-any transmission at very high data rates. A communication medium (FIG. 2) formed from an inverted tree network of nodes (1, 18, 22) and full duplex connecting links (13, 17, 19) permits the establishment of a path lock up-link through the network from a demanding port to a root node on a first-come first-serve demand access basis with arbitration at each distinct tree node level (FIG. 3). Broadcast transmission is perfected down-link over all fan-out paths from the root node. Collision is avoided by locking a path to a port and by limiting race conditions among active ports to only the leading edges of messages. Thus, relinquishment of a broadcast channel overlapped with transmission of a message does not result in path seizure since the occurrence of message leading edges is the singular path connection invoking event.

12 Claims, 12 Drawing Figures

NODE HIERARCHY

STAR NETWORK

NODE HIERARCHY

DATA FLOW THROUGH THE NETWORK

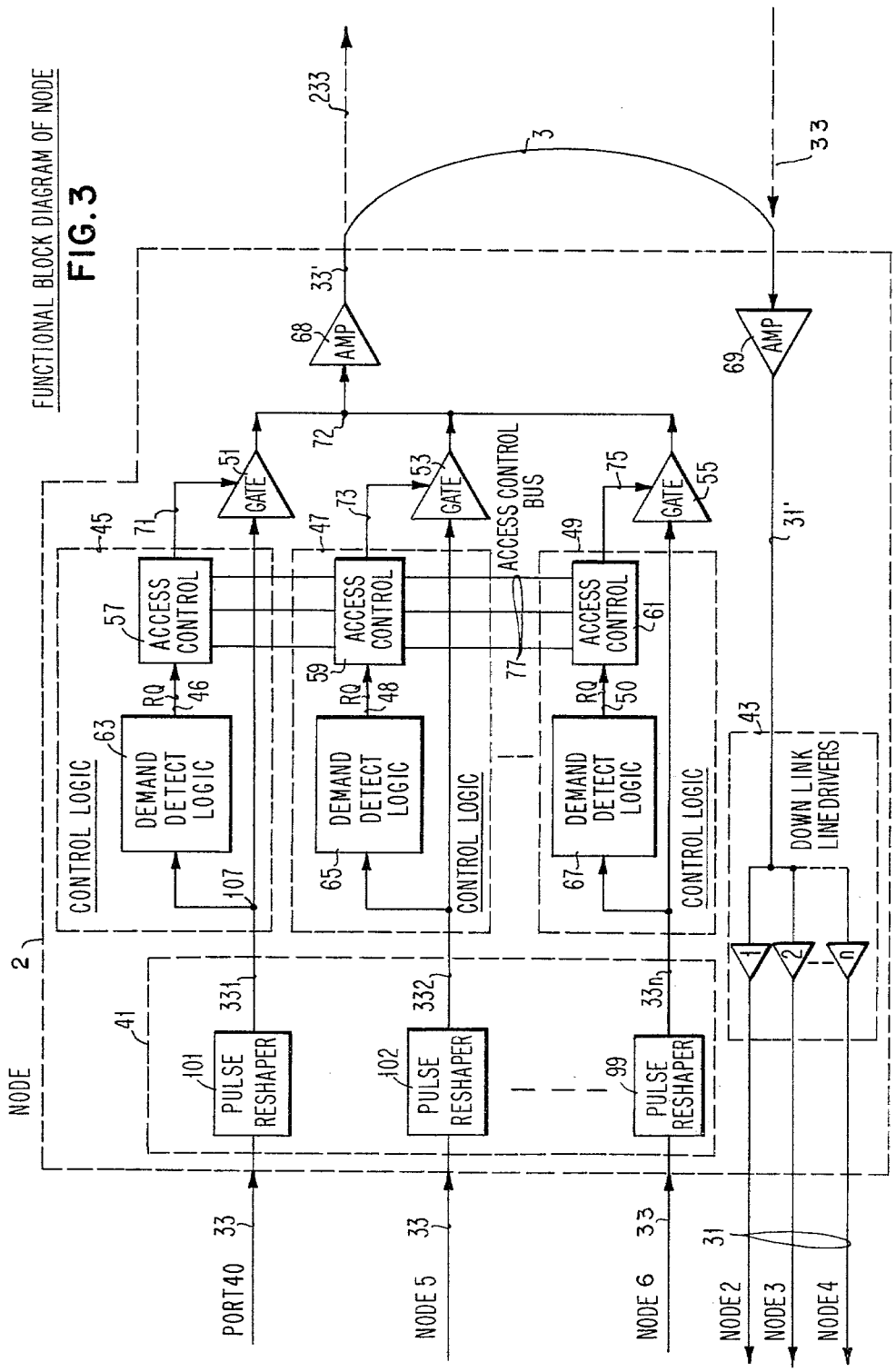

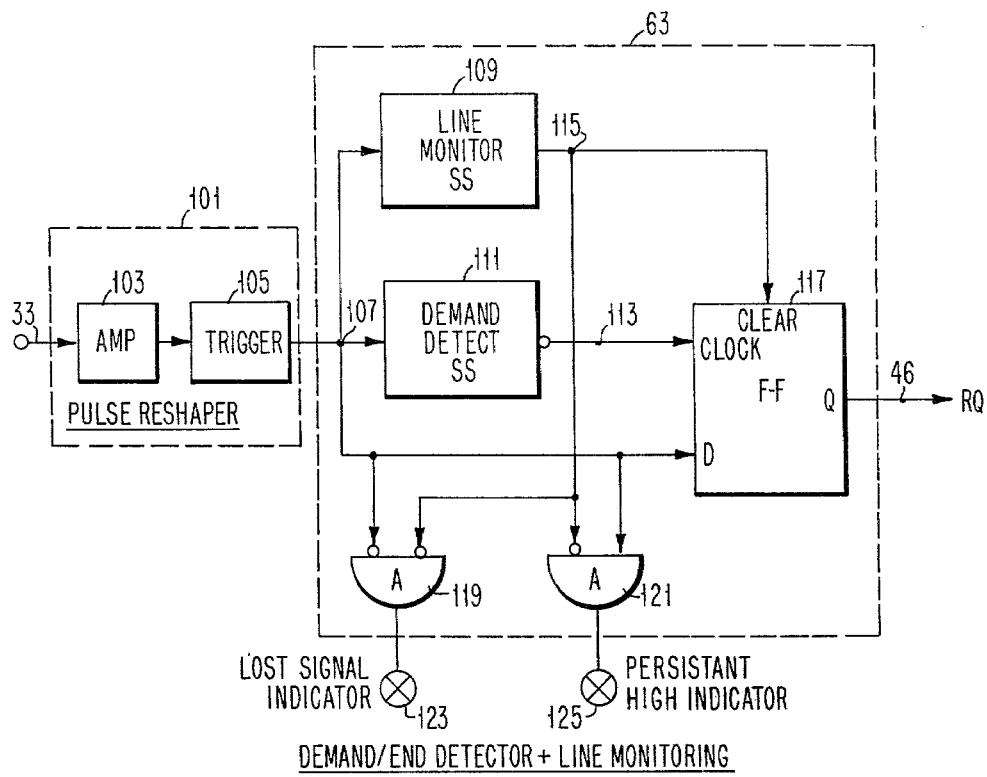
DEMAND/END DETECTOR + LINE MONITORING
FIG. 6
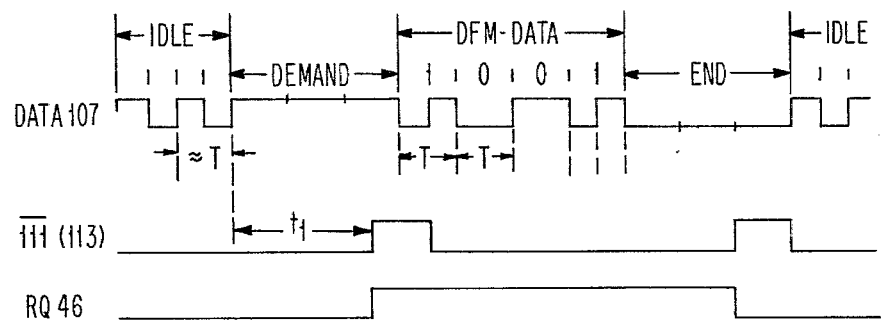
TIMING FOR SS 111    TIMING FOR SS 109
2T < t₁ < 3T
DEMAND = 3T    TIMING
FLAG
END = 3T
FLAG                FIG. 7

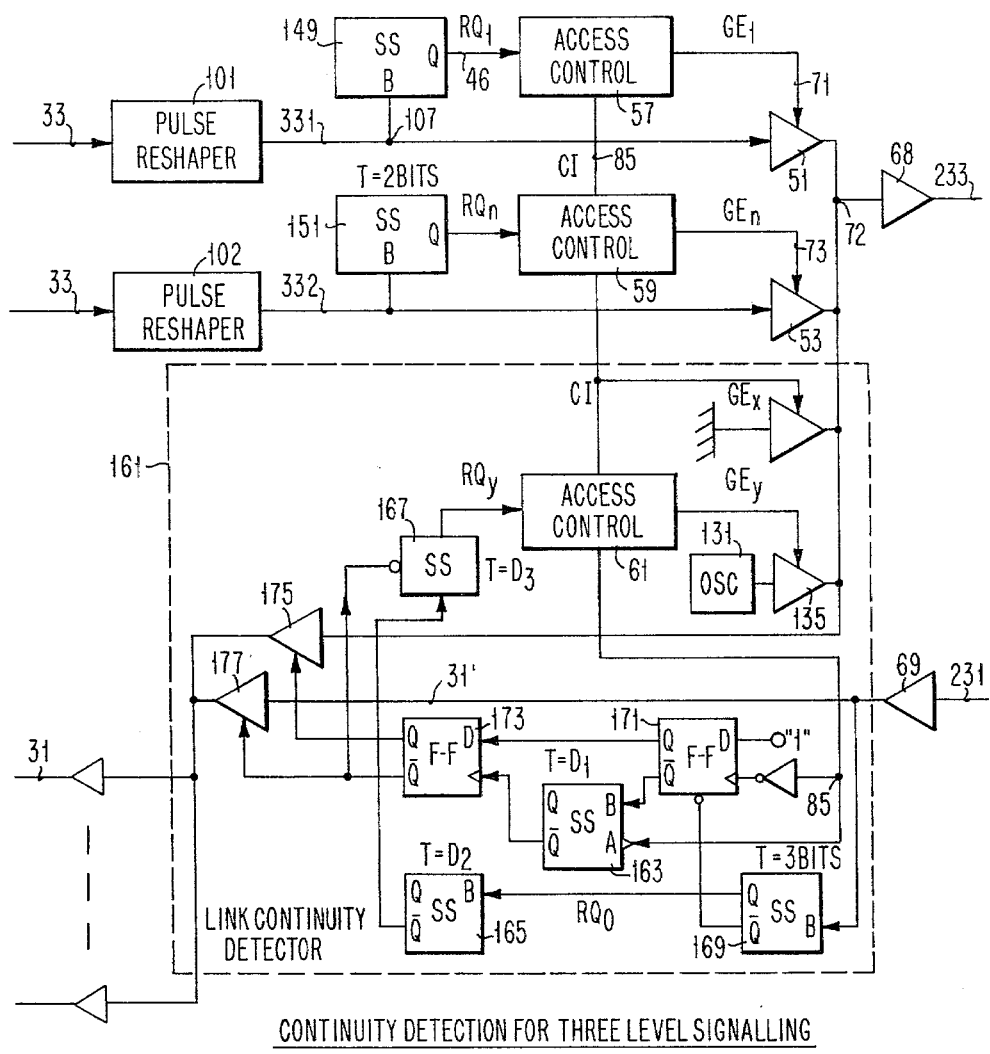
CONTINUITY DETECTION FOR THREE LEVEL SIGNALLING
FIG. 9
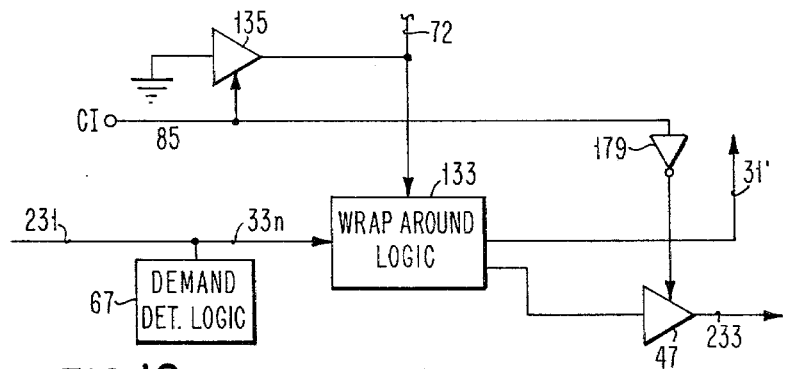
FIG. 12  NODE MODIFIED FOR TERNARY SIGNALS

METHOD AND MEANS FOR DEMAND ACCESSING AND BROADCAST TRANSMISSION AMONG PORTS IN A DISTRIBUTED STAR NETWORK

TECHNICAL FIELD

This invention relates to a method and means for demand accessing and broadcast transmission by ports attaching an inverted tree (star) network of ports, nodes, and fully duplex connecting links. More particularly, the invention relates to the multi-access of a broadcast network responsive to random port access requests and to any transmission at very high data rates, such as is found for broadband (packet) communication over a fiber optic medium.

BACKGROUND

This invention arises out of the desire to improve packet switching. As may be recalled, a "packet" is defined by the CCITT (the Consultative Committee on International Telegraph and Telephone of the International Telecommunications Union) as a group of binary digits including formatted data and call control signals which is switched as a composite whole. Relatedly, "packet switching" is taken to mean the transmission of data by means of addressed packets whereby a channel is occupied only during packet transmission. As pointed out both by Martin, "*Telecommunications and the Computer*", second edition, pages 457–481; 1976, and Davies, et al, "*Communication Networks for Computers*", Chapter 13; 1973, packet switching is intended primarily for real time machine-to-machine traffic. In this regard, a packet switching network of nodes and links is expected to deliver its packet in a fraction of a second, whereas a message switching system intended primarily for non-real time people-to-people traffic typically delivers its message in a fraction of an hour.

Generally, packet switching systems using demand access and broadcast transmission over a cable medium employ a carrier-sense function in which each port, prior to transmission, ascertains whether the communication path is free, i.e. Metcalfe et al, U.S. Pat. No. 4,063,220. Upon idle path detection, a port then transmits onto the medium. During transmission, if collision is detected, then the sending port backs off and retries after a random interval. While a port is transmitting, collision is detected by an analog comparison of the send and receive wave forms by each originating port. The non-correspondence of the signals creates an ambiguity as to the cause of the garbled transmission. That is, the garbled received signal may be due to sources other than a colliding port, such as attenuation in a constrained channel, noise, reflections and/or standing waves. This ambiguity further reduces the communication efficiency of the common path/medium.

Metcalfe, et al, U.S. Pat. No. 4,063,220, "Multipoint Data Communication System with Collision Detection", issuing Dec. 13, 1977, typifies this system. Metcalfe does send a jamming pattern to all ports indicating the original message was aborted. In contrast, Fitch et al, U.S. Pat. No. 3,914,743, "Data System Multi-Branch Junction Circuit, etc.", issuing Oct. 21, 1975, teaches the use of a junction circuit operative as a root node in an inverted tree network where up-linked data is multiplexed, with neither locking nor collision management, and where down-linked data is broadcast. Relatedly, the inverted tree geometry makes each node a concentrator. Each port terminates in a node and avoids contention in a tree geometry.

In demand access and broadcast transmission systems, the utility of semaphore techniques for resolving contention among asynchronous ports is believed limited. Broadly, semaphore techniques for a single CPU ensure synchronism among parallel tasks accessing serially reusable (temporally distributed) resources. However, the networking inherent in communication systems requires synchronism of *spatially* distributed resources as well as resources available over time. By this it is meant that the short distances within a CPU render point-to-point signal transmission near instantaneous whereas in a spaced apart network, propagation considerations in addition to timing must be taken into account.

Among other networks reporting broadband transmission are those in which a bus is time shared among ports directly coupling the bus. Two spatially separated ports signify the existence of a finite propagation delay from one to the other. This results in a difficulty of ensuring queued access to the bust except by way of a serialized or external status indication to each port. Protocols involving waiting reduce the transmission rate in a high-speed packet transmission system, if waiting is required each time prior to transmission. This is exemplified in the hydraulic analogy of multiple ports accessing a shared pipe in which it would be necessary to drain the pipe prior to the insertion of a new message (water injection from one port destined to other ports). Such a bus/port logic arrangement is described in co-pending patent application U.S. Ser. No. 053,493, filed on June 29, 1979, entitled Port Logic for a Communication Bus System, by Eswaran, et al.

THE INVENTION

It is an object of this invention to devise a demand access broadcast transmission method and means capable of supporting random port access and any-to-any transmission at very high data rates. It is a related object to devise access protocols that are speed independent and utilize simple channel captured protocols for each port.

The foregoing objects are satisfied in an embodiment utilizing a rooted tree topology. In a rooted tree network, all messages flow through the root (central) node from which they are broadcast to all ports in the network, including the originator of the message. There is, consequently, only one broadcast channel carrying all traffic between ports. The ports transmit messages at will. All nodes upward in the inverted tree hierachy must be captured up to the root node. The root node broadcasts the message down the tree. Reception of an echo of the transmitted message confirms to the originating port that its message was delivered by the addressee port. Additionally, an end-to-end acknowledgment guarantees error-free reception of the message. Parenthetically, the terms "packet", as previously defined, and "message" will be used synonymously throughout the remainder of the text.

The method of the invention utilizes a first-come, first-serve demand access discipline with arbitration in order to establish a path lock up-link through the network from a demanding port to a root node and broadcast transmission down-link over all fan-out paths. The invention, avoids collision by locking a path to a port. Furthermore, the first-come first-serve discipline and arbitration occurs at each distinct tree node level, and is implemented in part by XOR gating. In the preferred embodiments, collision can be made to occur only as a race condition between ports among the leading edges of messages. In this regard, a "race condition" is taken to mean the relative arrival time of the beginning of transmission, and in this system is defined by a window of not more than a few nanoseconds in width.

In a demand access system, if a channel is relinquished while messages are being transmitted over other up-links, then seizure of the channel resulting in truncated message broadcasting can occur. This is prevented in this invention by conditioning channel seizure to the detection of a signal indicative of transition from idle to data transfer mode on a given up-link.

The path lock is dependent only upon the message transmitting activity of a port. It does not require a port to listen prior to transmission as, for example, in Metcalfe. Further, unlike Fitch, the inverted tree topology of this invention does support any-to-any port transmission. Also, unlike Fitch, the presence of path locking avoids unintended seizure of a path or the conversion of a path transmission to noise.

It should be observed, that the inverted rooted tree network with path locking gives the same degree of service to all messages. In this sense, the network is especially useful where the message flow spreads out over an entire region spanned by the network. Also, the invention improves network reliability. This arises from the fact that wraparound logic located in the root and intermediate hierarchical nodes permits pathing for all uninterrupted branches. That is, a single node failure will not result in the entire network failing. The failure of any single node will only disconnect a counterpart subtree. In contrast, link failure in a ring network implies that the ring can only recover when it has the capability to reconfigure its topology. This requires redundant links and, therefore, additional link circuits.

BRIEF DESCRIPTION OF THE DRAWING

FIG. 3 sets forth a block diagram of a standard node exhibiting the arbitration locking facility with respect to inbound paths and the broadcast facility with respect to outbound paths.

FIG. 6 depicts an access request and activity monitoring portion for each path terminating in the node.

FIG. 7 is the timing and waveform diagram with respect to the request and monitoring activity of the logic shown in FIG. 6.

FIG. 9 shows a link continuity detector.

FIG. 12 illustrates the node modified for ternary signaling.

DESCRIPTION OF THE BEST MODE AND INDUSTRIAL APPLICABILITY

Figure 1:
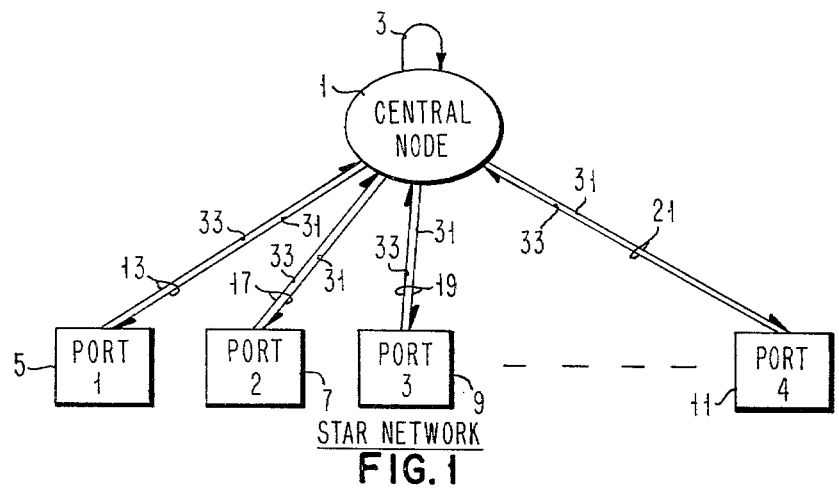
FIG. 1 depicts a star network of ports coupling a loop-back node over duplex links.

Referring now to FIG. 1, there is shown a node 1 with a number of ports 5, 7, 9, and 11 attached via full duplex transmission links 13, 17, 19, 21. The ports are the interface between the network and the attached computers or peripheral devices. Also, nodes are the network element used to interconnect the ports in an inverted tree arrangement and are not the source or sink of data. The network of this invention is based upon broadcast message transmission where a message generated by one port can be received by all other attached ports. Message selection is performed by address recognition. Neither message nor circuit switching is a requisite within this network. The node merely amplifies incoming signals on any inbound link 33 path locked therethrough and broadcasts on all outgoing links 31.

Each attached port can start a message transmission at any time. The control method and means inside each node guarantees that only one message can pass through the network at a time.

The logic in each node is capable of inhibiting the propagation of all packets from those ports which initiate a transmission, while said node is otherwise active. After some delay equal to the round trip propagation time, if a shut-out port detects that its transmission was unsuccessful then it may reinitiate message transmission. If packets (messages) from two or more ports arrive at a node simultaneously, for example, within a twenty nanosecond interval, then the ports are both shut out. In this way colliding packets do not get access to the broadcast channel. Repetition of this simultaneous initiation is practically impossible because of the minimum interval defined by the time window and by the differences in the local port clocks and propagation delays.

Figure 2:
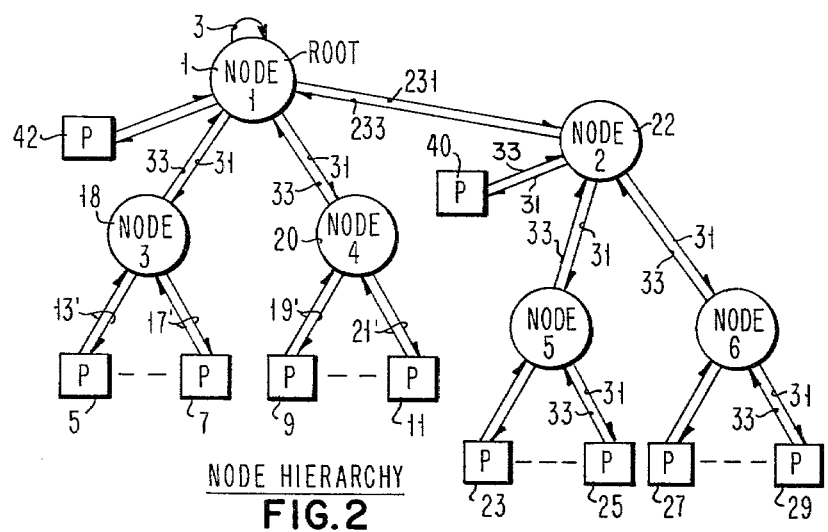
FIG. 2 shows an inverted tree hierarchy with the loop-back node as the root.

Referring now to FIG. 2, there is shown a simple hierarchy of nodes where several peripheral nodes 18, 20, 22 are connected to a central node 1. All the nodes are identical. Failure of the central node 1 does not affect the peripheral nodes. It only interrupts communication between them. Likewise, failure of a peripheral node does not affect the other nodes. Advantageously, the distributed star topology provides freedom in the selection of transmission links. Twisted pair, coax or optical fibers can be used. Note that this architecture has the flexibility to offer a low-cost network to low-speed users as well as providing extremely high bit rates supported by optical fibers, for instance. Also, network throughput is not limited by link distance. Any distance can be handled provided signal attenuation is compensated by repeaters when necessary. Note that in this inverted tree network a node may terminate lower-ranked nodes or ports. Ports 40, 42 in addition to 23, 25, 27, 29 can be selectively terminated in nodes of any hierarchical rank.

As previously mentioned, the network access protocol for each port is to transmit packets at will. If the transmitted packet is not received back at the sender within a delay T, the packet was unsuccessful and the sending port can retransmit the packet at any time. In this discussion the delay T constitutes the roundtrip propagation delay to the star node. Restated, each port can transmit packets at will and the only provision that has to be treated is the nondelivery of the packet.

Referring now to FIG. 3, there is shown a block diagram of a standard node exhibiting the arbitration and locking facility with respect to inbound lines 33 and a broadcast facility with respect to outbound lines 31.

In FIG. 3, each up-link 33 terminates in a one of signal conditioning circuits 41 for amplification and pulse reshaping. Each up-link may be driven by a counterpart port such as port 40 or node such as node 5. The up-link is terminated in a counterpart pulse reshaper such that the up-link for port 40 terminates in pulse shaper 101, while that for node 5 terminates in pulse shaper 102. Subsequent to pulse reshaping, each signal from a counterpart port or node is simultaneously applied to a corresponding control logic element (45, 47, 49) and a gate (51, 53, 55); i.e., signals from a pulse shaper 101 are placed on path 331 to node 107 where they may be concurrently applied to control logic 45 and as one of two inputs to gate 51. Each of the gates 51, 53, 55 is managed by the control logic and used to decide whether the packet transmitted by a port driving the control logic should capture the down-link. Significantly, the down-links 31 are not switched but are coupled by line driver circuits 43 only.

Each control logic element has two stages. The first stage is a demand detect circuit (63, 65, 67) which monitors an up-link 33. Its function is to decide whether or not a packet is present on an up-link, as manifest on the counterpart path (331, 332, 33n). If a signal is present, a request line RQ (46, 48, 50) is raised and applied to a next stage access control logic (57, 59, 61). Each access control logic element is interconnected by way of an access control bus 77. The outputs (71, 73, 75) of each counterpart access logic (57, 59, 61) regulates the gate (51, 53, 55) as a second input. In turn, the output of each gate is dot OR'ed at a common junction 72 where it is outputed from the node over path 33' through amplifier 68 either to a hierarchically superior node (father node) over path 233 or looped back to be broadcast over down-link drivers 43 over a loop 3, amplifier 69 and common path 31'. Relatedly, a signal from a superior node is received over path 231 and applied directly to amplifier 69, path 31' to line drivers 43.

The access control logic function 57 performs the channel capture function when the request line RQ 46 goes high, the access control logic checks if the down-link 31 is in use. If it is not, gate 51 for that up-link is opened and all other access control circuits 59, 61, are inhibited from capturing the down-link. Subsequently, on when request line RQ 46 goes low, access control logic 57 will release control of the down-link. This permits packets which arrive subsequently other up-links to capture it. Significantly, packets can arrive on other up-links 33 while the down-link 31 is busy. These packets will simply be ignored.

An advantage of this invention arises when a channel is released while other up-links are carrying packets. If a channel is allowed to be captured by one of the up-links 33, the packet transmitted will be truncated at the front since the signals were previously ignored during the prior busy period. Self-evidently, truncated messages cannot be correlated with their origins. This problem may be avoided by making channel capture a function of any new packet arrival on an up-link.

As may be surmised, the preferred embodiment does not instantaneously inhibit all other up-links as soon as a down-link is captured. This arises from the fact that signals take a finite time to be gated and propagated. For this reason, if two packets arrive at substantially the same time, they may both be allowed to use the down-links. This will result in a collision. In this regard, a collision window is defined to be the period of time between the capture of a channel by one up-link until the time when all other up-links are inhibited. In the method and means of this invention, the collision window should typically last no more than twenty nanoseconds. Due to the narrowness of the collision window, the probability of collision should be extremely small. Indeed it can be treated as noise on the line.

As will be subsequently described, each node contains logic to detect collisions when they do occur and momentarily shut off all up-links without blocking off any new requests. Utilizing this logic, collisions can be detected and stopped within a few integral multiples of the collision window duration. Another consequence of the narrow collision window is that the propagation delay difference between points in the network would spread out the arrival times of retransmitted packets to any given node such that they will not collide indefinitely.

Referring now to FIG. 2, and at the same time using the dotted line connections 231, 233, it is possible to construct a large network. Because of the new (dotted line) interconnections, the root node 1 of this tree network operates identically to the single star network described in FIG. 1. Each packet transmitted by a port 5 will travel through a number of nodes until it reaches the root node 1 where it is broadcast to all other ports. All the nodes in the tree are identical.

Figure 4:
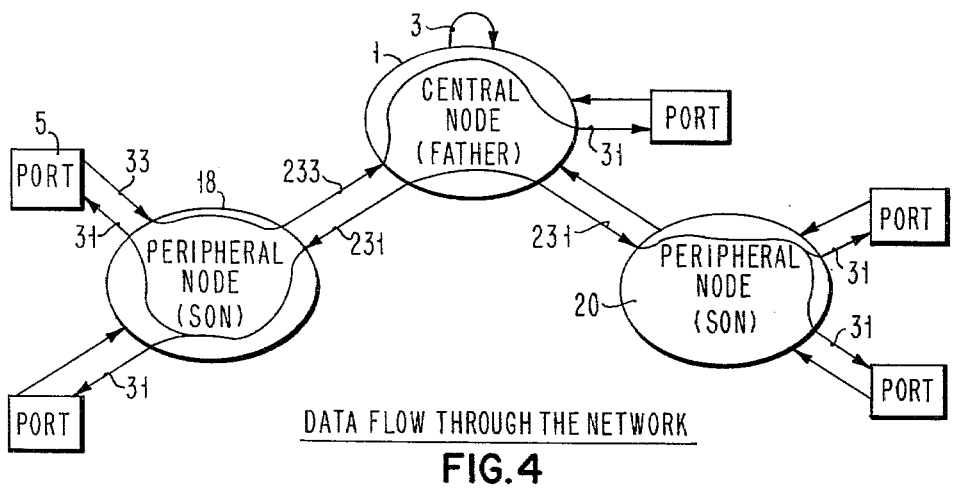
FIG. 4 is the network data flow.

Referring now to FIG. 4, there is shown the network data flow. A port 5 transmits signals to its node 18. Node 18 relays this signal to the central node 1. Node 1 transmits the signal back to all peripheral nodes 18, 20 which in turn relay the signal back to all ports. In this way all ports, including the one from which a message originates, receive the message. The broadcast channel is used for this transmission medium.

Ports recognize packets sent to them by inspecting a destination address. If this address matches with the port's address, the packet is accepted by the port. All other packets are ignored. Protocols for effectuating these tasks at the ports are not the subject of this invention. Reference may be made to Sproull, et al, "High Level Protocols", and Pouzin, et al, "A Tutorial on Protocols", published respectively in the Proc. IEEE, Vol. 66, No. 11, November 1978, at pages 1371-85 and 1346-70. The following description is direction to the method and means by which the control logic within the nodes guarantees that only one port at a time can capture the shared broadcast channel for packet transmission purposes.

Figure 5:
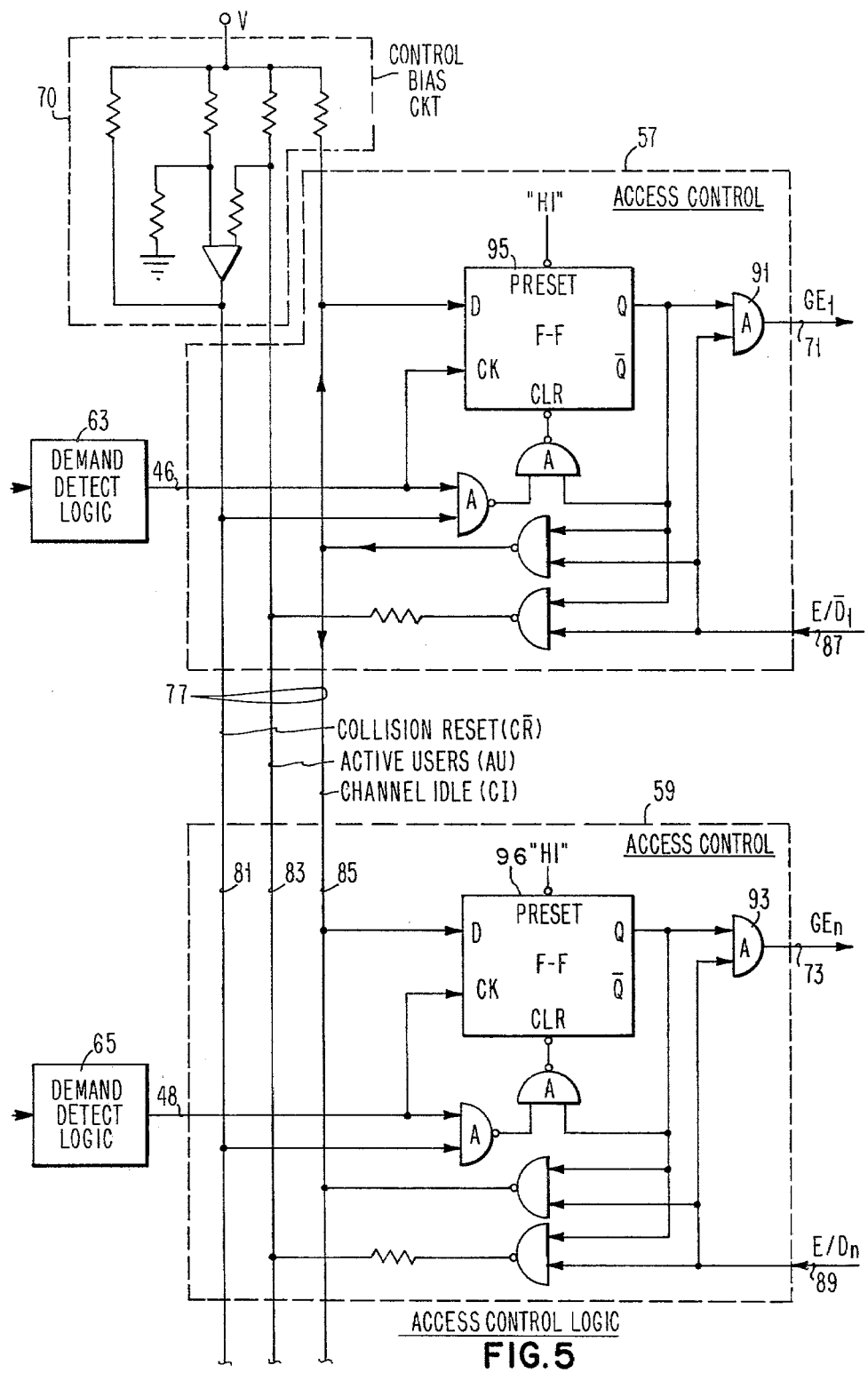
FIG. 5 illustrates the access control logic portion regulating shared access of inbound paths to a node by way of an access control bus.

Referring now to FIG. 5, there is shown the access control logic portion of a node for regulating shared access of inbound lines. FIG. 5 shows, among other aspects, the coupling between the individual control lines of bus 77 to each access control element 57 and 59. The control bus is electrically biased by control bias circuit 70 attached to predetermined voltage level V. The bus itself includes three control lines, 81, 83, and 85, respectively representing collision reset (CR), active users (AU) and channel idle (CI) conditions. The signal level on the control bus 77 lines are raised or lowered by such events as link enablement detected over path 87, 89 or the state of flip-flop 95. Paths 87 and 89 could be considered as power ON/OFF or enablement switches. For purposes of this invention they are to be considered always ON. Flip-flop 95 is of the D type as described in Montgomery Phister "Logical Design of Digital Computers", John Wylie & Sons, New York, 1958, at page 126. It is rising edge clocked. This means that the leading edge of a pulse at its clock input (CK) causes the flip-flop to sample the one or zero condition, i.e. high voltage or low voltage condition at the D input thereto. Each D type flip-flop also has a clear (CLR) input. When this input is enabled or set it in effect causes a zero to be stored and outputted from the flip-flop. This disables gate 91.

When there is no signal on either of request lines 46 and 48, there is little current drain through control bias circuit 70 so that the voltages on each of the lines 81, 83 and 85 are high. If each of the flip-flops 95 were originally in the zero state, then there is no change in the inputs of 91 and 93 and no change in the signal level on any of the lines of control bus 77.

Assume that a request, i.e. a pulse is raised on only one of the lines, say request line 46 and not on request line 48. At that instant of time there is a high voltage or a one present at the D input of flip-flop 95. The leading edge of the pulse on line 46 strobes the flip-flop at its CK input and causes the one present at the D input to be transferred through the flip-flop Q output as a one. This one is distributed to path 71 through AND gate 91. Concurrently, it appears as an inverted signal through counterpart AND NOT circuits drawing down the voltage on paths 83 and 85 respectively. This lowered voltage on path 83, for example, has the effect of being treated as a zero input at each of the D ports of the respective flip-flop. Thereby, any path seizure has, for example, a pulse appearing on request line 48 would effectively be blocked since the flip-flop in the counterpart acts as control circuit 59 would only strobe through a zero through the Q output and not pass through AND gate 93 to path 73.

When the request line 46 becomes high and the channel is idle, i.e. line 85 is high and the link enable line 87 is raised. Consequently, gate 91 is enabled, raising path 71 high. Simultaneously, channel idle line 85 is then lowered so as to inhibit any new requests and reduce the voltage on the active user control line 83. The voltage on the line 83 is constantly monitored, if it is below a certain threshold. This means that more than one user is active, and therefore collision reset line 81 is forced low to shut off all users until the collision stops. Since the D flip-flop 95 is rising edge clocked, channel capture is possible only when the packet first arrives. If channel capture is unsuccessful at that time, the subsequent idling of the channel does not allow capture by this partially discarded packet.

Figure 10:
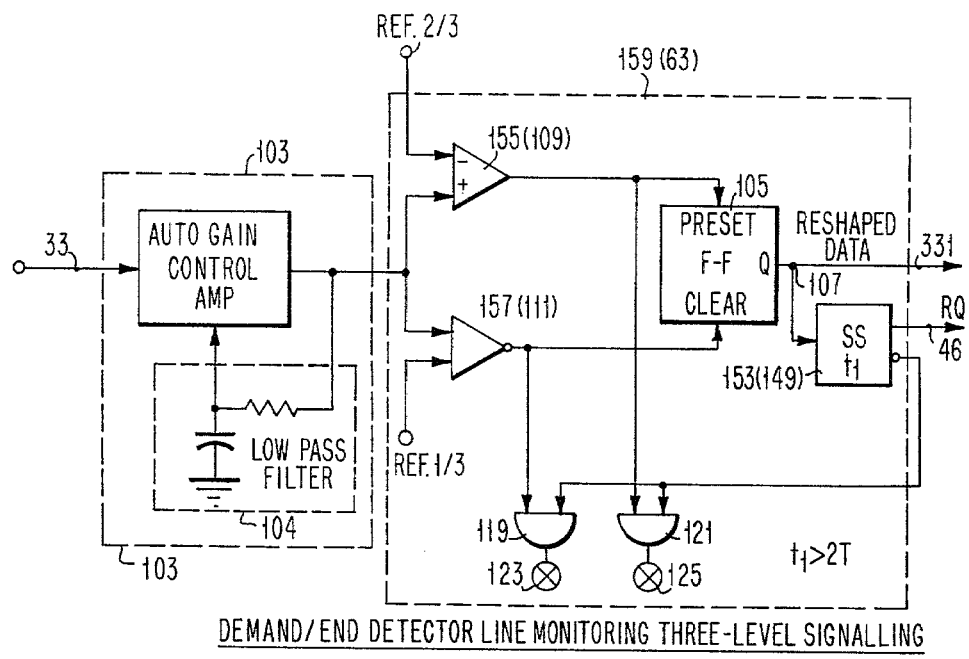
FIG. 10 sets forth an access request activity monitoring for ternary level signals.

Referring now to FIGS. 3, 6, 7, and 8, the following description will reference a system using either electrical or optical transmission links. In FIG. 6, binary signaling will be used. At each node, incoming signals are passed through amplifier 103 in pulse reshaper 101. As may be incidentally seen in FIG. 10, amplifier 103 may use automatic gain control in combination with a low-pass filter 104 in a feedback path. Such self-adjusting amplification compensates the signal for link attenuation. The amplified signal wave form is then reshaped by trigger circuit 105.

The transmission system has two modes, namely, that of a data mode and an idle mode. The data mode defines the interval within which data is transmitted with any one of a number of DC-free run-length limited codes, such as double frequency modulation code, (Manchester code). The idle mode is the interval during which links are assumed to be up without carrying data. In this invention, two systems are set forth which differ during the idle mode. In the first system, an encoded pattern of ones is transmitted. In the second, no signal is impressed upon the path during the idle mode.

Figure 8:
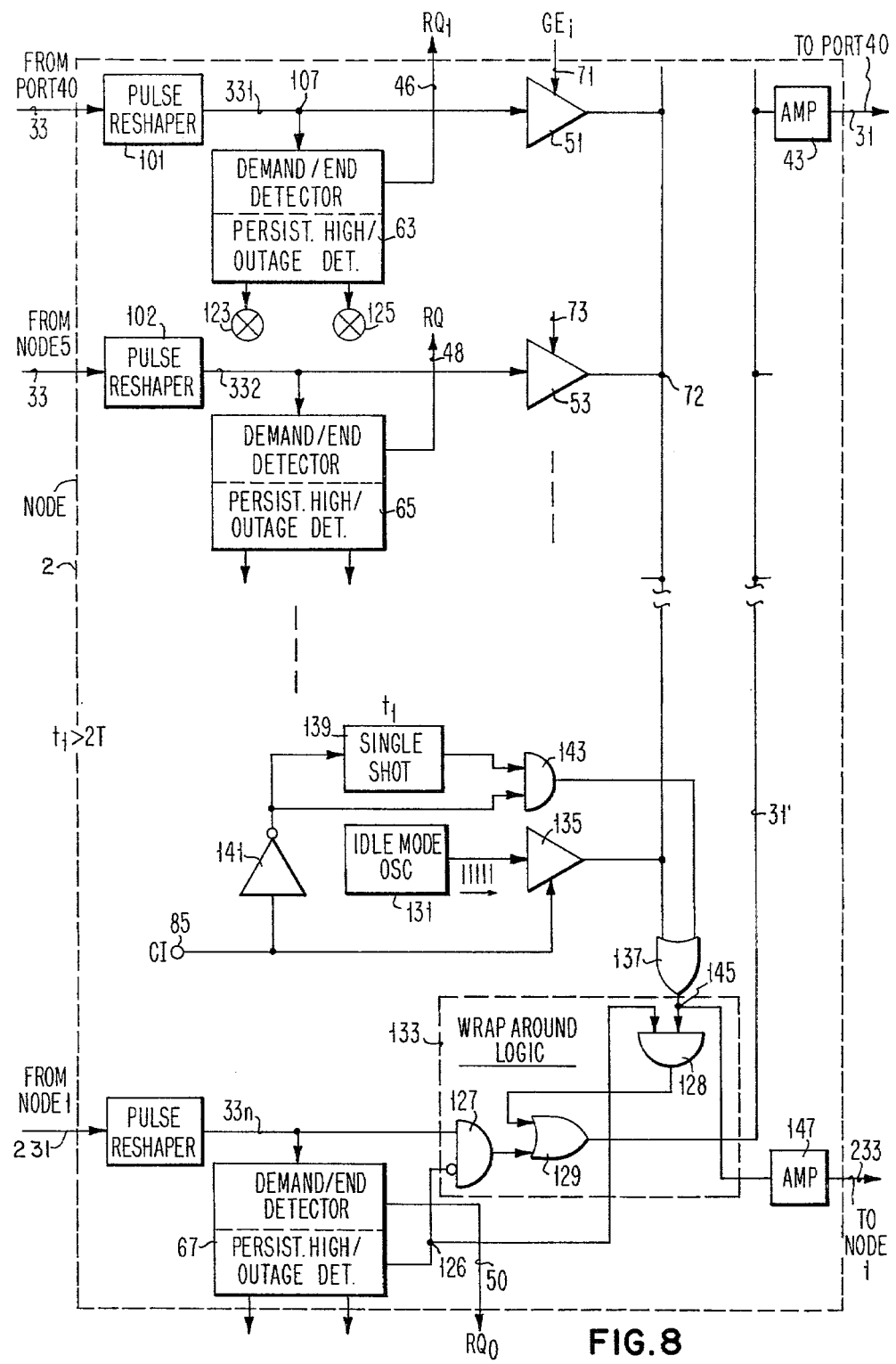
FIG. 8 exhibits the idle signal and wrap-around logic in the node.

Referring now to FIG. 8, there is shown node logic emphasizing an idle signal source and wrap-around logic for the system in which all ones are transmitted during idle mode. In the absence of any message, all links 33 from the connected ports 40, 42, 23, 25, etc. to the peripheral nodes carry continuous ones transmitted in one of the above-named time varying code forms. The RQ's 46, 48 are low and CI line 85 in the access control logic 57, 59 is high. An oscillator 131 inside each node then impresses a predetermined sequence of ones onto the link 233 to the root node 1. These ones are propagated to all inferior nodes by way of the wrap-around through the root node. The peripheral nodes relay this signal back to all ports. Thus, a continuous ones signal, transmitted with the above codes, will appear on all links 31, 33 entering and leaving the nodes as long as no messages are transmitted.

A port indicates a transition from idle mode to data mode by transmitting a continuous mark for three bits times, as is shown in FIG. 7. The end of a data mode is signaled by a port through the transmission of a continuous space for three bit periods. Only these two "code violations" are necessary to initiate and terminate message transfer through the network.

Referring now to FIG. 6, when taken together with FIG. 7, there is shown the access request and activity monitoring portion for each line terminating in a control logic element in a node. This demand/end detector and line monitoring includes a pair of single-shot multivibrators 109 and 111 to which the reshaped pulses from circuit 101 are applied concurrently at junction 107. Single-shot multivibrator 111 detects the start and end of the data mode. Its inverted output 113 is applied to the clock input of flip-flop 117. Since the demand and end flags are three-bit times in duration, the timing for single-shot multivibrator 111 is set there between. This is a unique sequence as can be seen in the timing diagram of FIG. 7 where both the idle pattern and the data pattern requires signal level transitions after two bit times in duration. Note, that the RQ output 46 from flip-flop 117 is raised when single-shot 111 changes state and is lowered only when single-shot 111 again changes state, indicative of its detection of an end-of-message signal of three bit times at the same signal level. Also note, that RQ 46 is connected to access control circuit 57.

The demand detector 63 also includes lost signal indicator 123 and persistent high indicator 125. Given the absence of a signal at junction 107 and a positive level from single-shot multivibrator 109 at junction 115, then AND gate 119 will be turned on indicating a lost signal. Likewise, the presence of a signal at junction 107 and the absence of a signal at 115 turns AND gate 121 on indicative of a persistent high signal.

Referring again to FIG. 8 when taken together with FIG. 4, when a port initiates a message transmission its RQ line goes high. If the port succeeds in getting access to the link 233 from the peripheral node 18 and hence to the root node 1, CI line 85 in the access control logic 57, as shown in FIG. 5, goes low and disconnects the oscillator 131 from the link 233 to the father by disabling gate 135. At the same time, the transition on line 85 fires a single-shot multivibrator 139 through inverter gate 141 which over gating path 143, 137, junction 145, and amplifier 147, signals to the root node 1 over path 233 that a transition has occurred from the idle mode to the data mode.

Root node 1 contains the same access control logic 57 as the peripheral nodes. The root node firmly gives access to the broadcast channel 31 by relaying the port's signal back to all peripheral nodes which, in turn, relay them back to all the ports.

At the end of the data mode, RQ 46 goes low, CI line 85 goes high, and the oscillator 131 is again switched onto the outgoing links.

In passing, it should be observed that the outputs of gated amplifiers 51 and 53 are selectively placed upon junction 72 and are gated through 137 and presented to the up-link 233 over junction 145 and amplifier 147. In the event that the node operates as a root node, then the wrap-around logic 133 provides a down-link path connection through gated path 128, 129, 31' and amplifier 43 to down-link 31. In FIG. 8, the access control circuits are shown only by implication in that they take a RQ input and deliver a control output 71, 73 to a counterpart gate 51, 53. Interestingly, if the node in FIG. 8 is to be operated peripherally, then the downstream output from root node 1 is applied over path 231 and is gated straight through logic 133 to path 31', 43, 31.

Referring now to FIG. 9, there is shown a link continuity detector and an arrangement in which the transition from idle to data mode is simply triggered by a mark signal arriving at the node over an up-link 33. The incoming signals pass through the pulse reshapers onto the single shot multivibrators 149, 151. These signal shots are connected to respective pulse reshapers 101 and 102 over paths 331 and 332. A transition, for example, on line 331 to a mark level single shot 149. The time constants of these single shots are greater than two bit times for the diphase or Manchester codes. A return on line 331 to a low level for longer than two bits time permits the single-shot 149 to reset. This signals the end of the data mode. The RQ 46 line in FIG. 9 is up high only during data mode. A root node detects the start of data mode in the same fashion as do the peripheral nodes.

Figure 11:
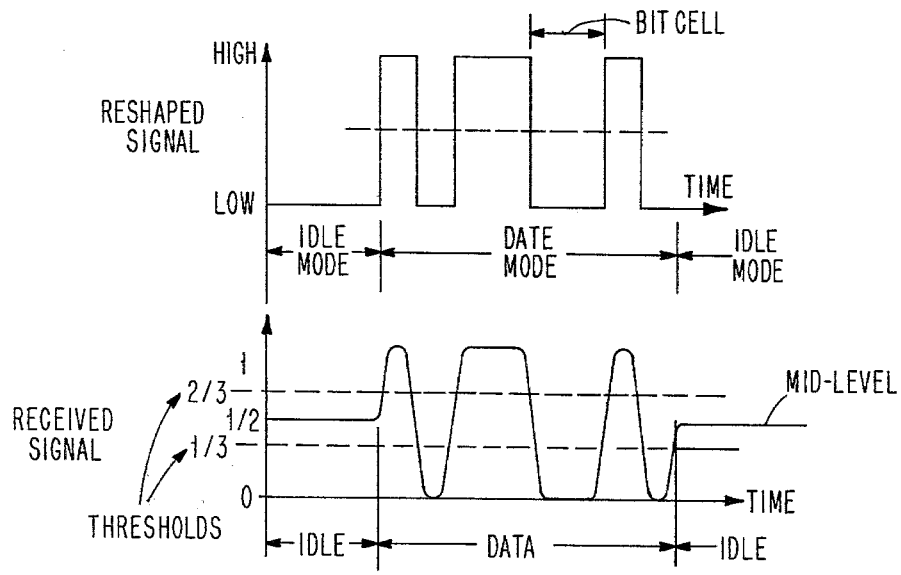
FIG. 11 is the timing and waveform diagram with respect to the ternary level signals of the arrangement shown in FIG. 10.

For implementing an inverted tree network of nodes and interconnecting duplex links with optical fibers it has been found advantageous to utilize three-level ternary signaling. In this regard, reference should be made to FIGS. 8, 10, 11. FIG. 11 shows the timing and waveform for the three-level signal. During idle modes, a mid-level DC signal is transmitted as shown in this figure. However, during data mode, a binary signal is transmitted using any DC free transmission code. The receive signal is processed according to the logic depicted in FIG. 10. More particularly, the signal is amplified by an automatic gain control amplifier in element 103 which compensates using filter means 104 for any deviations from a standard average signal level caused by the transmission link, connector, and transmitter/detector variations. The output of thresholding elements 155 and 157 trigger pulse shaping flip-flop 105 in element 159. Transitions between the idle mode and the data mode are detected by the simple triggering of a loss signal as an output of flip-flop 107 setting single-shot multivibrator 153. Single-shot 153 then raises the RQ 46 input to the access control logic. The absence of a transmission in excess of two bit times signals the transition from data to idle mode and is detected also at junction 107 by single-shot 153.

Referring now to FIG. 12, there is shown a node modified for ternary signaling compared with the binary signaling architecture set forth in FIG. 8. The principal difference resides in the elimination of the circuit elements 131, 139, 141, and 143 and coupling CI line 85 to junction line 72 through gated amplifier 135 and to gated amplifier 147 through inverter 179.

The transmission systems described above include extensive network monitoring functions with a minimum of additional hardware. These fault detection mechanisms in distributed star topology simplify the location and isolation of any failures of links and nodes. The transmission systems in which a signal is continuously transmitted during idle mode render either the loss of signal or a persistent high signal easy to detect.

Referring again to FIG. 6, the detection of a persistent high-signal level is indicated at junction 125 and signal loss at 123. Single-shot 109 is edge triggered by transitions in the received and reshaped signal at junction 107. The time constant of single-shot 109 is preferably set to be two bit times or longer, depending on the desired delay after which the node reacts to an abnormal situation. Lack of transitions in the signal allow the single-shot 109 to reset. This clears flip-flop 117 and the RQ line 46 then goes low. This response isolates the link and the port from the nodes access control logic 57. All other links remain operational. Relating the output of single-shot 109 to the signal, low or high, permits the detection of either loss of signal or persistent high signal level.

Referring again to FIG. 10, there is set out the failure detection circuit for the three-level transmission system. Only one single-shot 153 is used for detecting transitions between idle and data modes as well as link failures. Lack of transitions in the signal waveform lets the signal-shot 153 reset, after which, RQ line 46 goes low. Inspection of the comparative outputs 155, 157 by gates 119 and 121 discriminates between loss of signal and persistent high-level signal.

Referring now to FIG. 9, single-shots 149, 151 also detect a persistent high-signal condition. Absence of transitions in the data signal on line 331 causes single-shot 149 to reset. The RQ line 46 goes low, which isolates the link and the port from the access logic. A persistent high situation at detector 63 will be indicated at the point 125 in FIGS. 6, 10, when the data signal is high while the single-shot is reset. Because no signal is transmitted during idle mode, a different strategy may be used to detect link outages. A persistent low signal from a father node may be due either to the network idling or a failure. To discriminate between these conditions an idle message protocol is employed. Whenever the incoming link from a father node has idled for a given period of time, a short packet (containing a series of pulses) is sent to the root node 1. Since transmission of signals requires that some signal be received after a given propagation delay, a failure would be detected if some signal is not received shortly. The logic within link continuity detector 161 performs this function. Since idle messages are sent only when the network is idling, no real efficiency is lost. Further, the transmission of an idle packet by any one network component inhibits the need for other network components to do the same.

Referring again to FIG. 9, link continuity detector 161 supervises the links between the peripheral nodes (31, 33) and the root nodes (231, 233). The timing circuits in link continuity detector 161 include single-shot 167 set for measuring the idle packet duration $D_3$, single-shot 165 for measuring the maximum packet duration and idle interval $D_2$, and sinle-shot 163 defining the maximum round-trip propagation delay.

The link continuity detector 161 operates in the following manner. When a signal from an up-link 233 is locked through to a further up-link path 33 through junction 72 and amplifier 68, DCI line 85 is raised and, among other functions, initiates the timing of single-shot 163 and 167. The former is triggered by flip-flop 171 and the latter by flip-flop chain 171 and 173. Single-shots 163 and 165 respectively measure maximum round trip propagation and idle pakcet duration. A signal present from root node 1 over path 231 and amplifier 69 turns off single-shots 163 by way of single-shot 169 and flip-flop 171 and turns off single-shot 167 through the additional flip-flop 173 and single-shot 165.

A link failure is detected when no packet is perceived on the link from the root node within this delay. Packet arrival is detected in the same manner as on-links from ports to peripheral nodes.

Failure of the communication between the root and peripheral nodes, either loss of signal or persistent high-level signal, or root node inability to return packets to peripheral nodes, results in automatic wrap-around of the signal through element 133, FIG. 8. Signals continue to go to the root node and at the same time they are directly transmitted back from the peripheral node to the port. This mechanism keeps peripheral nodes operational when communication with the root node has become impossible. As soon as valid signals are received from the root node, the wrap-around function in the peripheral nodes terminates.

In conclusion, it should be noted that the network distributed star topology is built from identical nodes. In this invention any transmission medium can be used; that is, twisted pair, coax, optical fibers, microwaves and any mixtures thereof. This permits the construction of low cost networks for low data rate users, as well as networks exploiting the extreme bit rates supported by optical fibers. Relatedly, extremely simple random access broadcast protocol is invoked permitting ports to transmit at any time. The port only senses whether the packet transmitted reappears at the port receiver. If not, the port retries. In this manner, ports are freed from the carrier sense, collision detection, and randomixed retransmission described in the Metcalfe reference.

Each node in this invention functions only to connect a port demanding transmission to the broadcast channel, if the channel is idle. The nodes ignore the demand if the channel is busy. Simultaneous demands are ignored. The broadcast channel does not propagate truncated or colliding packets.

While the invention has been particularly shown and described with reference to preferred embodiments thereof, it will be understood by those skilled in the art that the foregoing and other changes in form and detals may be made therein without departing from the spirit and scope of the invention.

Having thus described the invention, what is claimed as new and desired to be secured by Letters Patent is:

1. A data communications system comprising:
a transmission medium formed from an inverted three network of nodes and full duplex connecting links, the tree network having a network root node, said root node of a tree or subtree thereof having an in-degree of zero, each duplex link including an up-link and a down-link respectively defining a signal path direction toward or away from the network root node, each up and down-link being in either an idle or occupied state;
a plurality of transceiving ports attaching the network at selected nodes, ready ones of the ports transmitting messages at will;
each nodes includes:
means for ascertaining whether the state of each terminating up-link and down-link is idle or occupied; and
means responsive to the first occurring ascertained state transition from idle to occupied among the terminating up-links for completing an exclusive signal path connection to an outbound up-link only if the outbound up-link is concurrently idle.

2. A data communication system according to claim 1 wherein each node further includes:
a pulse source; and
means responsive to an ascertained idle state on all terminating up-links for coupling said pulse source to an outbound up-link.

3. A data communication system according to claim 1, wherein the state ascertaining means includes:
means for terminating an up-link;
a first register;
means responsive to a transition from a time varying waveform to a waveform of constant slope on said up-link for setting the first register to a first value and responsive to a transition from a constant to a time varying waveform for setting the register to a second value.

4. A data communications system according to claim 1, wherein the signal path connection means includes:
means responsive to the initiation of a signal path connection to an outbound up-link for sensing the duration of the round trip propagation delay between a selected tree node and the network root node and for invoking a wrap-around loop connection between the terminating up-links and outbound down-links at the network root node upon the second round trip propagation's exceeding a predetermined amount.

5. A data communication system according to claim 1, wherein the signal path connection means includes:
means responsive to a state transition from occupied to idle upon an up-link within an established connection for relinquishment of said connection.

6. A method for any-to-any port transmission of messages through an inverted tree network of nodes and full duplex connecting links, the tree network having a network root node, said root node of the tree or sub-tree thereof having an in-degree of zero, each duplex link including an up-link and a down-link respectively defining a signal path direction toward or away from the network root node, the method being executable by ready-to-transmit ones of a plurality of transceiving ports individually coupling the network at selected nodes, comprising the steps of:
establishing a message initiated path lock up-link through the network from a ready-to-transmit one of the ports to the network root node only by way of a first come, first serve demand access discipline among the up-links terminating at each distinct tree node level to a concurrently idle out-bound up-link; and
broadcast transmitting any message over all down-links fanning out from the network root node, which message was received over an up-link path connection to said network root node.

7. A method according to claim 6, wherein the messages consist of packets.

8. A method according to claim 6, wherein each message includes an addressee port, the method steps further comprising:

confirming to the originating port that its message was delivered to the addressee port by receipt of the down-link echo of the transmitted message by said originating port.

9. A method according to claim 6, wherein the network is operable in a data and idle mode, the method steps further comprising:

impressing signals indicative of the idle mode upon up-links not transmitting messages;

sensing at the up-links terminating in each node any signal change from idle-to-data-modes; and causing the fist come, first served demand access discipline to be executed at any given node upon sensing idle-to-data-mode transition upon any up-links terminating in the given node.

10. A method according to claim 9, wherein the idle mode signals impressed upon up-links are formed from a predetermined pattern, mode transition being sensed as the change in the up-link from any other pattern to the predetermined pattern (FIGS. 7, 11).

11. A method according to claim 10, wherein the predetermined pattern consists of a series of consecutive pulses.

12. A method according to claim 10, wherein the predetermined pattern consists of a constant level, while the nonpredetermined pattern consists of ternary levels.

* * * * *

UNITED STATES PATENT AND TRADEMARK OFFICE
CERTIFICATE OF CORRECTION

PATENT NO. : 4,347,498

DATED : August 31, 1982

INVENTOR(S) : Felix H. Closs et al

It is certified that error appears in the above—identified patent and that said Letters Patent is hereby corrected as shown below:

IN THE ABSTRACT

Line 15, "Transmission" should be -- retransmission --.

Column 7, line 35, the following paragraph was omitted:

"Suppose lines 81, 83, and 85 were all high representing the condition of the paths being available when request lines 46 and 48 are concurrently raised. Then, respective ones would appear at the Q output. These would be gated through their respective AND NOT circuits to substantially draw down the voltages on paths 83 and 85. This current drain on control bias circuit 70 results in a lowered voltage on path 81. This in turn disables the associated AND NOT gates and appears as a second one on the two inputs to the second AND not gate activating the clear (CLR) inputs to each of the flip-flops. This results, as previously described, in forcing a zero through the Q output of both flip-flops turning the respective AND gates 91 and 93 off and returning voltages on each of the lines 81, 83 and 85 to a raised condition."

UNITED STATES PATENT AND TRADEMARK OFFICE
CERTIFICATE OF CORRECTION

PATENT NO. : 4,347,498
DATED : August 31, 1982
INVENTOR(S) : Felix H. Closs et al It is certified that error appears in the above—identified patent and that said Letters Patent is hereby corrected as shown below:

Column 11, line 13, "shots" should be -- shot --.

Column 11, line 63, "three" should be -- tree --.

Column 11, line 66, "in" should be -- N --.

Column 14, line 1 "fist" should be -- first --.

Signed and Sealed this

Twenty-second Day of February 1983

[SEAL]

Attest:

GERALD J. MOSSINGHOFF

Attesting Officer    Commissioner of Patents and Trademarks